United States Patent [19]

Kraft et al.

[11] 4,042,961

[45] Aug. 16, 1977

[54] ELECTRO-OPTICAL TRANSDUCER SYSTEM

[75] Inventors: Francis J. Kraft, Waterloo; Peter G. Puhak, Seneca Falls, both of N.Y.

[73] Assignee: GTE Sylvania Incorporated, Stamford, Conn.

[21] Appl. No.: 657,712

[22] Filed: Feb. 13, 1976

[51] Int. Cl.[2] .................. H04N 5/645

[52] U.S. Cl. .................. 358/248

[58] Field of Search .................. 358/248

[56] References Cited

U.S. PATENT DOCUMENTS

| | | | |
|---|---|---|---|
| 3,569,881 | 3/1971 | Torsch | 358/248 |
| 3,831,123 | 8/1974 | Aldrich et al. | 358/248 |

*Primary Examiner*—Richard Murray

*Attorney, Agent, or Firm*—Norman J. O'Malley; William H. McNeill; Robert T. Orner

[57] ABSTRACT

In an electro-optical transducer system employing a cathode ray tube having a substantially frusto-conical body terminating at its wide end in a viewable face plate and at its narrow end in a cylindrical neck and having a deflection yoke substantially permanently bonded thereto adjacent the junction of the neck to the body by intermediate mounting means in a manner which inherently provides unwanted stresses upon said yoke, the improvement comprising: yoke stress relief means mounted upon the neck and in contact with the yoke. The yoke stress relief means can be in the form of a circumscribing clamp which is affixed to the neck of the tube and in contact with projecting ears on the rearmost portion of the yoke.

8 Claims, 4 Drawing Figures

ELECTRO-OPTICAL TRANSDUCER SYSTEM

BACKGROUND OF THE INVENTION

This invention relates to electro-optical transducer systems employing a cathode ray tube and a deflection yoke and more particularly to means for relieving unwanted mounting stresses in the deflection yoke.

Deflection yokes are employed with cathode ray tubes in order to deflect an electron beam in a predetermined manner across the phosphor screen of the cathode ray tube. In the past it has been the practice to mount the deflection yoke within the signal receiver employed with the cathode ray tube by means of a complex jig arrangement which allowed the yoke to be moved in at least three directions in order to center the beam in an appropriate manner. Recently it has become the practice to adjust the yoke to the cathode ray tube at the tube manufacturing plant and then semi-permanently bond the yoke in a fixed position on the tube by means of a hardenable adhesive. It was with the latter form of yoke mounting that this invention is concerned.

It has been found that while the bonded yoke-cathode ray tube arrangement appears to be desirable, in practice it has been extremely difficult to maintain the semi-permanent type of bond required for practical purposes. In practice the seal between the yoke holding means and the tube has been found to fracture completely or to loosen sufficiently to destroy the critical beam alignment. Attempts to correct this problem by employing different adhesives have been found to be unsuccessful. It has recently been determined that part of the problem resides in the inherent stresses which develop throughout a yoke mounting system when the adhesive bonding method is used. Accordingly it is believed to be an advance in the art if a means could be found for obviating the above difficulties.

OBJECTS AND SUMMARY OF THE INVENTION

It is therefore an object of the invention to obviate the disadvantages of the prior art.

It is another object of the invention to reduce the inherent stresses in adhesively bonded yokes.

It is a further object of the invention to enhance the manufacturing operations of the cathode ray tube-bonded yoke assemblies.

These objects are accomplished in one aspect of the invention by the provision of yoke stress relief means mounted upon the neck of the tube and in contact with the yoke.

DESCRIPTION OF THE PREFERRED EMBODIMENTS

For a better understanding of the present invention together with other and further objects, advantages, and capabilities thereof, reference is made to the following disclosure and appended claims in connection with the above-described drawings.

Figure 1:
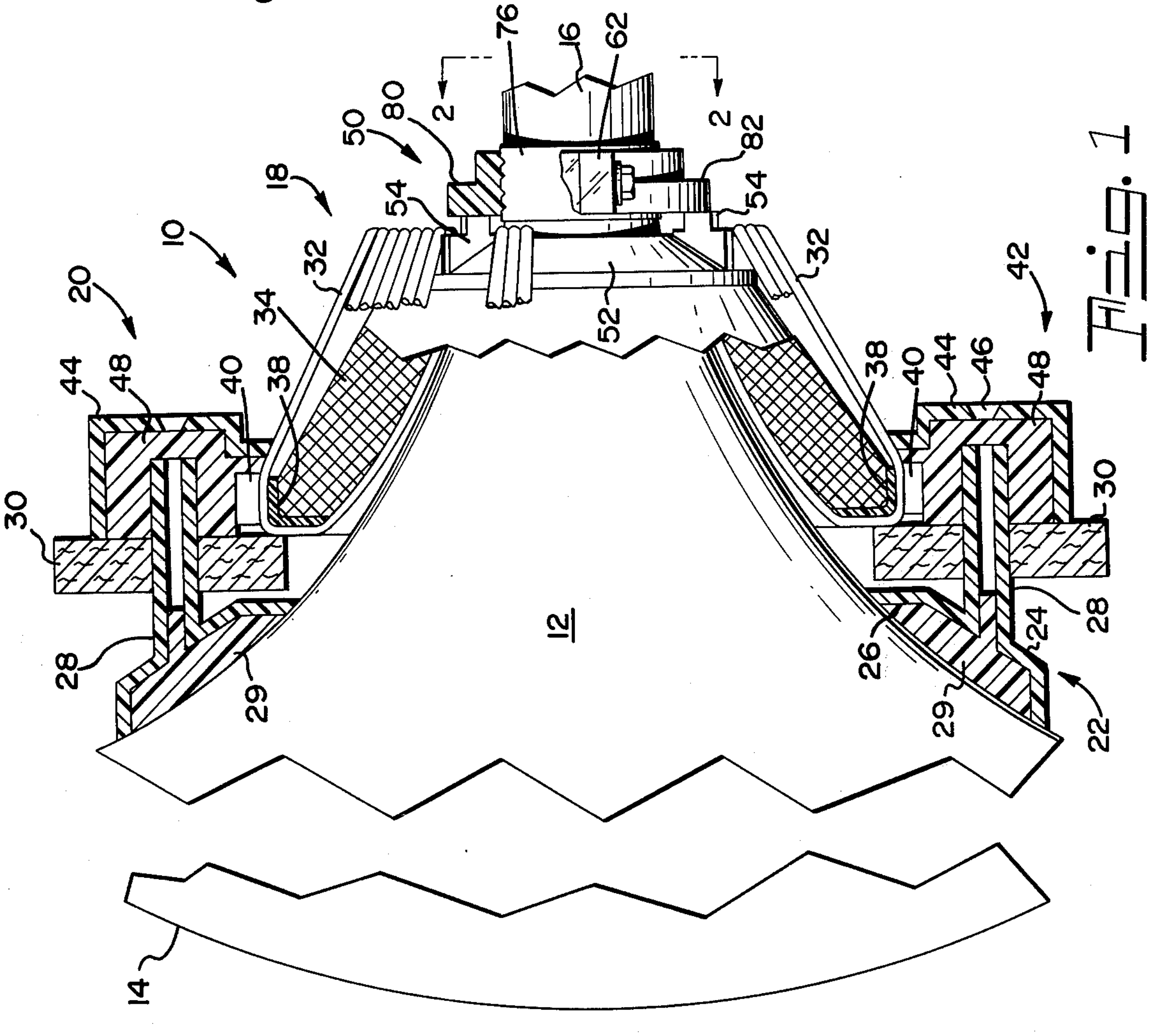
FIG. 1 is an elevational, sectional view illustrating an embodiment of the invention.

Referring now to the drawings with greater particularity, there is shown in FIG. 1 an electro-optical transducer system 10 employing a cathode ray tube 12 having a substantially frusto-conical body terminating at its wide end in a viewable face plate 14 and at it's narrow end in a cylindrical neck 16. A deflection yoke 18 is substantially permanently bonded to the tube 12 adjacent the junction of the neck 16 to the body. The mounting is accomplished by intermediate mounting means 20. The yoke mounting means 20 comprises an annular tube ring 22 which is sealed to the rear wall of the cathode ray tube 12. The tube ring 22 is substantially symmetrically located and surrounds the cylindrical neck 16 of the tube. The tube ring 22 is provided with an outer surface 24 and an inner hollow cavity 26. The inner cavity 26 can be provided with an adhesive groove (not shown) which extends circumferentially about the interior of cavity 26. The outer surface 24 is provided with a plurality of hollow studs 28. Two such studs 28 are shown in the drawing. The hollow interior of each of the studs 28 communicates with the inner cavity 26 of the tube ring 22 so that a hardenable adhesive can be injected thereinto. During the mounting of the tube ring 22 it is positioned in its desired location on the rear wall of cathode ray tube 12 and is held, as by a jig arrangement, in that desired position. Liquid adhesive 29 is then forced through the hollows in studs 28 under sufficient pressure to cause the liquid adhesive to flow about the interior cavity 26 of the tube ring 22. After the adhesive has hardened or while the jig holding the tube ring 22 in position is still in place, a plurality of sponge washers 30 are fitted over the hollow studs 28, one washer to each stud. Thereafter, the yoke mounting takes place.

The deflection yoke 18 comprises a ferro-magnetic core 34 having a plurality of toroidal windings thereabout. Some of the windings are partially indicated at 32. The core 34 is also provided with a front crown 38 which has a plurality of tabs 40 thereon and extending outwardly and rearwardly therefrom. The front crown 38 can be any suitable material such as plastic. The yoke 18 is inserted into a yoke retainer ring 42. The yoke retainer ring 42 comprises a circumferential wall having a plurality of spaced hollow pockets 44 provided thereon. The hollow pockets 44 are spaced in the same manner and in the same number as the hollow studs 28 on the annular tube ring 22. Pockets 44 have an open bottom and one side and the closed top has an opening 46 therein. The tabs 40 on the front crown 38 of the yoke engage at least one of the walls of each of the hollow pockets 44 to maintain the yoke position.

With the yoke 18 mounted in the yoke retainer ring 42, the yoke retainer ring is positioned in a jig over the hollow studs 28. That is, the hollow studs 28 project into the hollow pockets 44 of the yoke retainer ring 42. The yoke and yoke retainer ring are held in a jig that is adjustable in X, Y, and Z directions. The bottom or tube facing openings of the hollow pockets 44 are seated against and sealed by the sponge washers 30. After the optimum position of the yoke is determined, it is held by the jig in that optimum position and an adhesive in liquid form is forced through the apertures 46 in an amount to surround and bond to the hollow studs 28. When the adhesive has hardened the jig can be removed and the yoke is then permanently mounted in its desired position. Further illustrations and descriptions of this mounting method can be found in U.S. Pat. No. 3,831,123.

It will be seen from FIG. 1 that when the yoke is thus mounted the internal curvature of core 34 is spaced from the curved portion of the tube wall. This spacing exists all the way around the tube. Because of this peculiar mounting there are a number of stresses that are inherent in the mounting system. These stresses derive from the spacing and the fact of the plastic annular tube ring 22 being adhesively bonded to the radial wall of the cathode ray tube 12. It has been found that the stresses inherent in this mounting system have very detrimental effects in that during use, and even during storage, the stresses will cause a shifting moment of the yoke which destroys the previously aligned deflection. Some of these stresses are so great as to occasionally destroy the seal between the adhesive and the glass bulb of the tube. Prior attempts at correcting this problem have employed various adhesives without any noticeable success.

Accordingly, there is herewith provided yoke stress relief means 50 mounted on the neck 16 of tub 12 and in contact with the rearmost portion of yoke 18. In the illustration of FIG. 1, yoke 18 is shown as also being provided with a rear crown 52, again of a suitable material such as plastic. The rear crown 52 is provided with a plurality of projecting ears 54 which extend beyond the rearmost plane of yoke 18. When such a construction is employed the yoke stress relief means 50 will contact the ears 54 of the rear crown 52.

Figure 2:
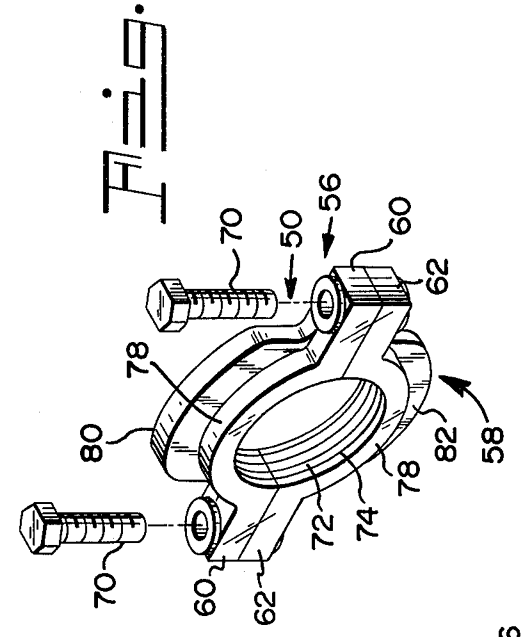
FIG. 2 is a perspective view of one form of yoke stress relief means as embodied by the invention.

The yoke stress relief means 50 circumscribes the neck 16 of the tube 12 and comprises a pair of mating, split annuli 56 and 58 (See FIG. 2, in which the position of the means 50 is reverse from that shown in FIG. 1). The annuli are substantial mirror images of one another and are formed with projecting, mating tabs 60 and 62 containing joining means in the form of a threaded aperture to accept a bolt 70. The internal circumference 72 of the yoke stress relief means closely matches the circumference of the neck of the tube and is provided with a plurality of spaced apart, raised ribs 74. These raised ribs are preferably triangular in cross-section (See FIG. 3). And, while the number of the ribs is variable, there are preferably four of them to achieve a good bond with the neck of the tube.

To further increase the rigidity of the yoke stress relief means 50 there is preferably employed therewith a band of penetrable material 76, such as an adhesive fiberglass tape. The band of tape circumscribes the neck of the tube and lies between the internal circumference 72 of the yoke stress relief means 50 and the neck of the tube. The bank of material 76 should be of sufficient thickness to accept penetration of the ribs 74.

Yoke stress relief means 50 also has an external circumference 78 which is provided with at least partially circumscribing, outwardly extending flanges 80 and 82. When the yoke stress relief means 50 is employed with a yoke 18 which has a rear crown and projecting ears 54, the outwardly extending flanges 80 and 82 are dimensioned such as to contact the ears 54.

Figure 3:
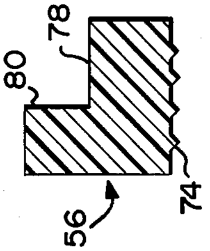
FIG. 3 is an enlarged sectional view of a portion of the yoke stress relief means of FIG. 2.

In FIG. 3 is shown a cross-section of one-half of the yoke stress relief means 50 which more fully illustrates the outwardly extending flange 80 and the external circumference 78.

Figure 4:
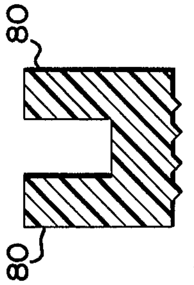
FIG. 4 is an elevational, sectional view of an alternate embodiment of the yoke stress relief means.

In FIG. 4 is shown an alternate construction wherein two spaced apart flanges 80 are provided. This construction allows yoke stress relief means 50 to be reversable instead of having a particular orientation for the tube neck.

It will be seen from the above that employment of the yoke stress relief means 50 solves all of the problems encountered with the prior art. When properly positioned and appropriately tightened and in contact with the rear most portion of the yoke the stresses inherent in the yoke mounting system are relieved.

While there have been shown what are at present considered to be the preferred embodiments of the invention it will be apparent to those skilled in the art that various changes and modifications can be made herein without departing from the scope of the invention as defined by the appended claims.

What is claimed is:

1. In an electro-optical transducer system employing a cathode ray tube having a substantially frusto-conical body terminating at its wide end in a viewable face plate and at its narrow end in a cylindrical neck and having a deflection yoke substantially permanently bonded thereto adjacent to the junction of said neck to said body by intermediate mounting means in a manner which inherently provides unwanted stresses upon said yoke, theimprovement comprising: yoke stress relief means mounted upon said neck and in contact with said yoke.

2. The system of claim 1 wherein said yoke stress relief means circumscribes said neck.

3. The system of claim 2 wherein said yoke stress relief means comprises a pair of mating split annuli each having joining means.

4. The system of claim 3 wherein said yoke stress relief means has an internal circumference closely matching the circumference of said neck and said internal circumference is provided with a plurality of spaced apart raised ribs.

5. The system of claim 4 wherein said yoke stress relief means includes a band of penetrable material circumferentially surrounding said neck and lying between said neck and said internal circumference, said band of penetrable material being of sufficient depth to accept penetration of said ribs.

6. The system of claim 4 wherein said yoke stress relief means has an external circumference which is provided with at least partially circumscribing, outwardly extending flanges.

7. The system of claim 6 wherein said yoke has a rear portion provided with a plurality of extending ears and said flanges contact

8. In a method of fabricating an electro-optical transducer employing a cathode ray tube and a deflection yoke the steps comprising: fastening a tube ring to said tube in a position adjacent the neck of said tube by means of a hardenable adhesive, said tube ring having a plurality of neckwardly projecting studs; fastening a yoke ring carrying a deflection yoke to said projecting studs on said tube ring by means of a hardenable adhesive; and fastening yoke stress relief means to said neck of said tube in contact with the rearmost portion of said yoke, whereby said yoke mounting is stress relieved.

* * * * *

UNITED STATES PATENT AND TRADEMARK OFFICE
CERTIFICATE OF CORRECTION

PATENT NO. : 4,042,961
DATED : August 16, 1977
INVENTOR(S) : Francis J. Kraft and Peter G. Puhak It is certified that error appears in the above-identified patent and that said Letters Patent are hereby corrected as shown below:

Col. 3, line 21 - Please delete "tub" and insert -- tube --.

Col. 3, line 52 - Please delete "bank" and insert -- band --.

Col, 4, Claim 7, line 3 - After "contact", please insert -- said ears. --

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*